March 5, 1963 — I. H. HALLBERG — 3,079,901

UNTHROTTLED INTERNAL COMBUSTION ENGINE

Filed Sept. 28, 1960 — 4 Sheets-Sheet 1

Inventor:
Irving H. Hallberg

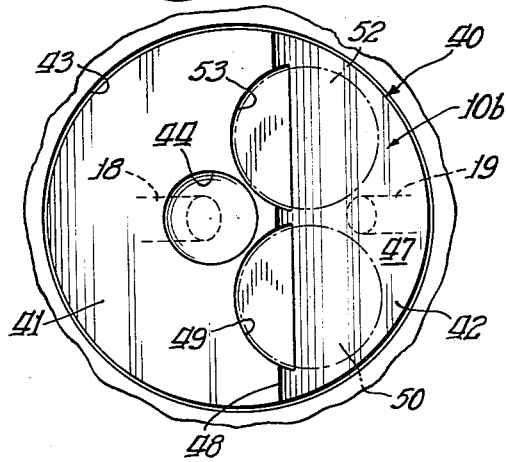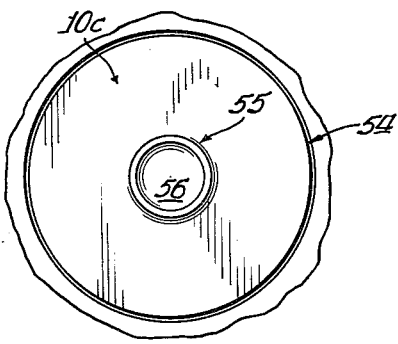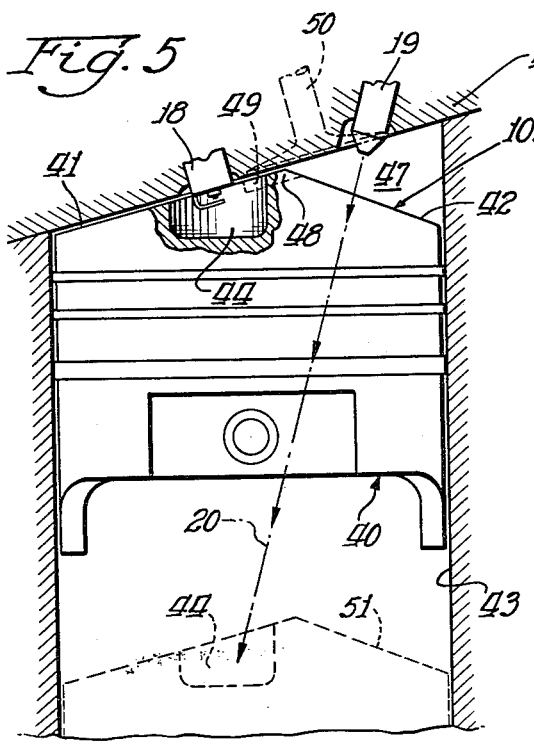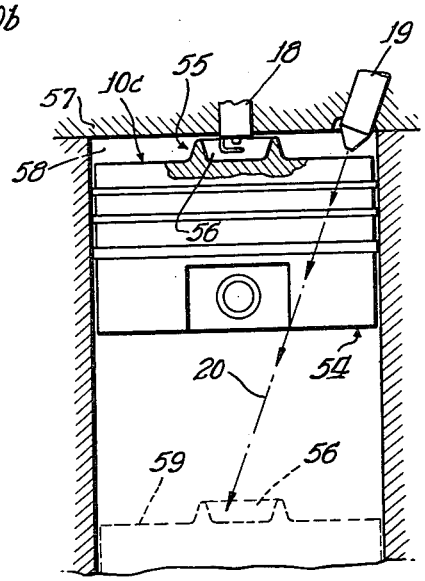

March 5, 1963  I. H. HALLBERG  3,079,901
UNTHROTTLED INTERNAL COMBUSTION ENGINE
Filed Sept. 28, 1960  4 Sheets-Sheet 3
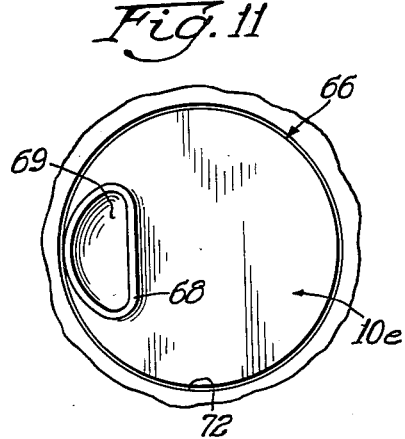
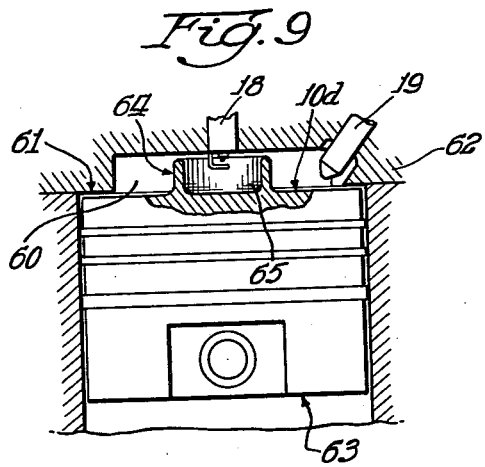
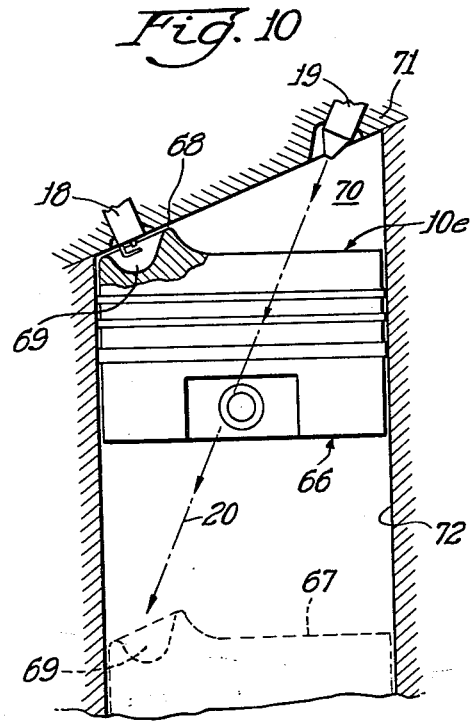
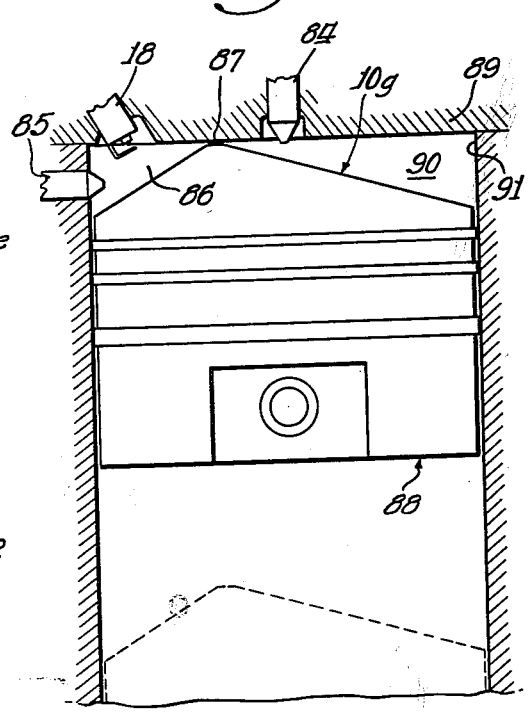
Inventor:
Irving H. Hallberg March 5, 1963 I. H. HALLBERG 3,079,901
UNTHROTTLED INTERNAL COMBUSTION ENGINE
Filed Sept. 28, 1960 4 Sheets-Sheet 4
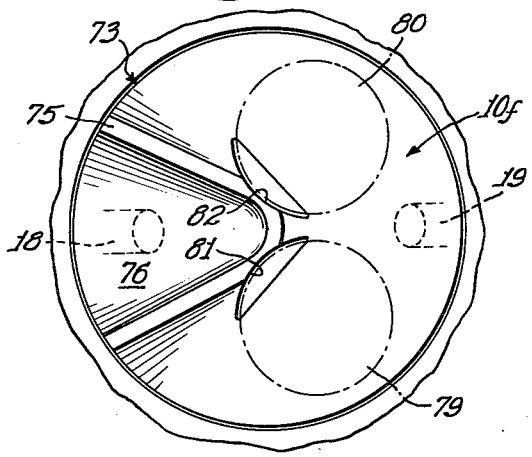
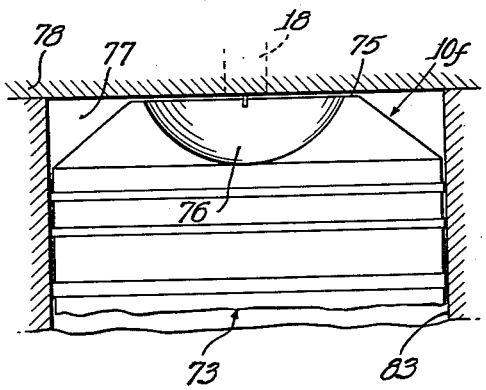
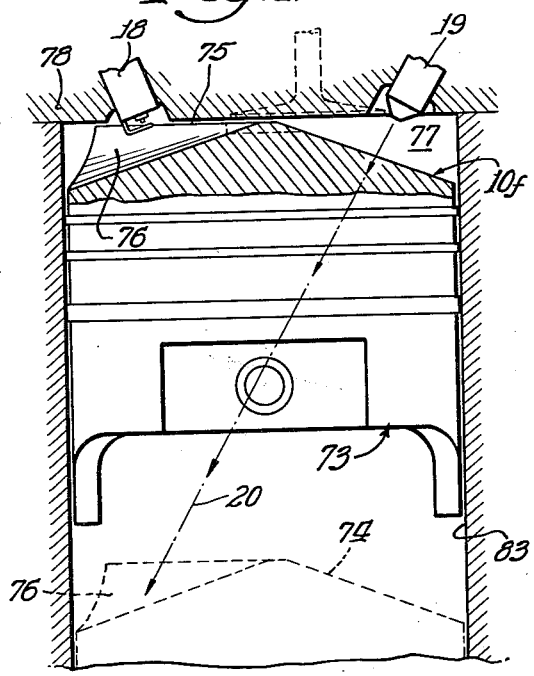
Inventor:
Irving H. Hallberg

United States Patent Office 3,079,901
Patented Mar. 5, 1963

3,079,901
UNTHROTTLED INTERNAL COMBUSTION ENGINE
Irving H. Hallberg, Des Plaines, Ill., assignor to Borg-Warner Corporation, Chicago, Ill., a corporation of Illinois
Filed Sept. 28, 1960, Ser. No. 59,087
10 Claims. (Cl. 123—32)

My invention relates to unthrottled internal combustion engines, and, more particularly, to an engine of this type wherein the fuel is ignited by means of a spark plug and wherein an auxiliary ignition chamber is provided by means including an irregular crown of the piston when the piston comes into close proximity with the cylinder head at the top of the piston stroke.

A full complement of air is provided with each cycle of operation, and, only the amount of fuel supplied to the engine varies, therefore improving thermal efficiency which results in improved fuel economy and a reduction of hydrocarbon content in the exhaust gas as compared with most conventional spark ignition engines in which power is changed by varying both fuel and air quantity to maintain a fixed mixture ratio.

Most unthrottled internal combustion engines are complex, requiring considerable engine design change, leading to high costs and therefore giving little commercial promise. The engine, according to my invention, uses conventional parts with slight modification in the shape of the crown of the piston and possibly the cylinder head and only the addition of a simplified injection system. Engines of this type have been built wherein an auxiliary ignition chamber is provided in the cylinder head. Such an ignition chamber has a constricted throat connected with a main combustion chamber which lies between the piston head and the cylinder head. A spark plug is inserted in the auxiliary ignition chamber and fuel is injected into the auxiliary ignition chamber whereby a rich mixture is provided in the auxiliary ignition chamber and a lean mixture in the main combustion chamber. This arrangement provides a mixture sufficiently rich for ignition by spark. However, the constriction between the auxiliary ignition chamber and the main combustion chamber may become exceedingly hot, thereby causing pre-ignition. In an engine, according to my invention, a combustion space is provided at top dead center of the piston between the crown of the piston and the cylinder head which comprises an auxiliary ignition chamber and a residual combustion space which is comparable to the main combustion chambers of currently known throttled internal combustion engines. However, the design of my engine is such that when the fuel is ignited in the auxiliary ignition chamber, which is of a richer mixture than that of the residual combustion space or chamber, there is no danger of preignition because no such constriction referred to above exists between the two chambers. Consequently, overheating of a portion of metal within a combustion area is avoided and the danger of preignition from such a cause is eliminated. Complete scavenging of the auxiliary ignition chamber, after combustion, is not possible in the type of engine referred to above because of the constriction between the auxiliary combustion chamber and the main combustion chamber. This incomplete scavenging results in a limitation of the maximum power obtainable from a given size engine and dilution of the ignition mixture with exhaust gases. In an engine, according to my invention, complete scavenging is not interfered with because after combustion the auxiliary ignition chamber and the residual combustion space become one chamber.

It is therefore a primary object of my invention to provide an internal combustion engine which has characteristics which improve thermal efficiency resulting in improved fuel economy at part load and reduction of hydrocarbons in the exhaust gas.

It is also a primary object of my invention to provide a spark ignition unthrottled internal combustion engine having an auxiliary ignition chamber and a residual combustion space wherein complete scavenging occurs with respect to the auxiliary ignition chamber.

It is an important object of my invention to provide an unthrottled internal combustion engine which has the smooth combustion characteristics of a conventional internal combustion engine.

It is also an important object of my invention to provide an unthrottled internal combustion engine wherein a pocket or ignition cell is provided into which sufficient fuel is injected at the approximate bottom of the piston stroke to create a mixture sufficiently rich for ignition in an auxiliary ignition chamber that is provided by the pocket at the time of the spark occurs.

It is another object of my invention to reduce the possibilities of preignition in unthrottled internal combustion engines.

It is a further object of my invention to provide an unthrottled spark ignition internal combustion engine which is simple in construction, requiring little change in engine design as compared with throttled internal combustion engines and therefore is low in manufacturing costs.

It is still another object of my invention to provide an unthrottled internal combustion engine wherein the pressure rise of the ignited fuel is gradual thereby giving the smoother combustion characteristics of an Otto cycle engine rather than the rough characteristics of a diesel engine.

My invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIG. 5 is an axial section through a cylinder of still another modified form of my unthrottled internal combustion engine showing an injection nozzle, a spark plug, and a piston having a crown with a pocket or ignition cell therein which, however, produces results similar to those obtained by the embodiment shown in FIG. 1;

FIG. 6 is a plan view of the irregular crown of the piston in FIG. 5 showing in phantom the location of the valves, the spark plug and the injection nozzle;

FIGS. 7, 10 and 12 are axial sectional views similar to FIG. 5 but showing other embodiments of my invention, which, however, produce results similar to those obtained by the embodiments shown in FIG. 1;

FIGS. 8, 11 and 13 are plan views of the irregular crown of the piston shown in FIGS. 7, 10 and 12, respectively, showing the position and other characteristics of the pocket or ignition cells;

FIG. 9 shows a modification of the irregular crown of the piston in FIG. 7;

Figure 1:
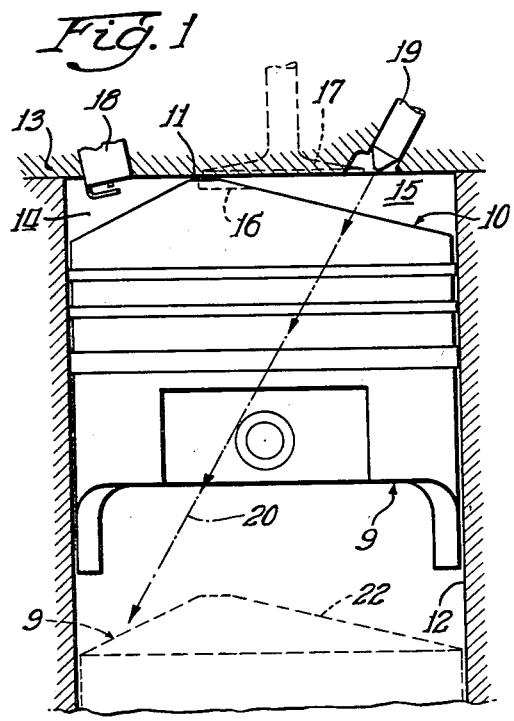
FIG. 1 is an axial section through a cylinder of an unthrottled internal combustion engine showing a fuel injection nozzle, a spark plug, a pocket or ignition cell, a piston, and, in schematic, the location of valves.

FIG. 14 is a side elevation of the piston in FIG. 12 viewed from the left, showing diagrammatically a pocket or ignition cell in the irregular crown of the piston in FIG. 12; and FIG. 15 is an axial section view similar to FIG. 1 but showing still another embodiment of my invention characterized in that it is provided with two injection nozzles, which, however, produces results similar to those obtained by the embodiment shown in FIG. 1.

Like characters of reference designate like parts in the several views.

The drawings show generally the construction of the piston, the cylinder and the location and arrangement of the spark plug and the injection mechanism in my unthrottled internal combustion engine. Although a number of embodiments are shown, the results produced are similar in all of them. Generally speaking, the crowns of the pistons are irregular in shape and the cylinders have a substantially flat head which may be at right angles or on a slant with respect to the axis of the cylinder. The irregularities of the crown of the pistons are such that pockets or ignition cells are provided which when the pistons are at T.D.C., become auxiliary ignition chambers. Fuel injection is provided and in such a manner that a richer mixture is provided in the auxiliary ignition chamber than in the remainder of the space between the crown of the piston and the cylinder head hereinafter referred to as the residual combustion space. Firing of the fuel mixture is initiated in the auxiliary ignition chamber by a spark plug from which combustion spreads to the residual combustion space. The pockets or ignition cells shown in the several embodiments vary with respect to location and configuration. However, they all comprise irregularities which are in close proximity to the cylinder head when the piston is at the top of its stroke.

More specifically, with respect to the various embodiments of my invention, FIG. 1 shows a piston 9 having an irregular crown 10 provided with a ridge 11 shown at top dead center within a cylinder 12. The T.D.C. position of the piston 9 places the ridge 11 in close proximity to a cylinder head 13. A pocket 14 is formed between the ridge 11 on one side of the irregular crown 10 and the adjacent wall of the cylinder 12, which thereby provides at T.D.C. of the piston 9 an auxiliary ignition chamber. On the opposite side of the irregular crown 10, a residual combustion space 15 is provided between the ridge 11 and the adjacent wall of the cylinder 12. The ridge 11 is provided with a notched-out portion 16 which serves as a clearance for an intake valve head 17. A spark plug 18 is inserted in the area of the auxiliary ignition chamber. An injection nozzle 19 is inserted through the cylinder head 13 at an angle such that a fuel injection stream 20, designated by arrows, is directed at the pocket 14 when the piston 9 is at approximately bottom dead center, as indicated by dotted line 22.

Figure 2:
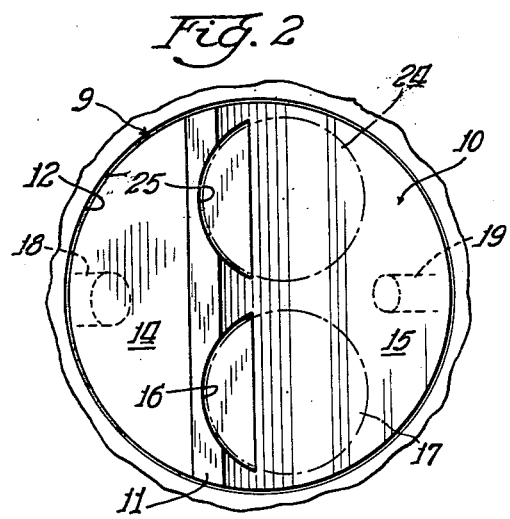
FIG. 2 is a plan view of the irregular crown of the piston in FIG. 1 with respect to the location of the valves, the spark plug and the injection nozzle, all shown in phantom.

FIG. 2 is a view looking down on the irregular crown 10 of the piston 9 in FIG. 1, showing, in phantom, the spark plug 18, the injection nozzle 19, the intake valve head 17 and an exhaust valve head 24. The ridge 11 is also provided with a notched-out portion 25 to provide clearance for the exhaust valve head 24.

Figure 3:
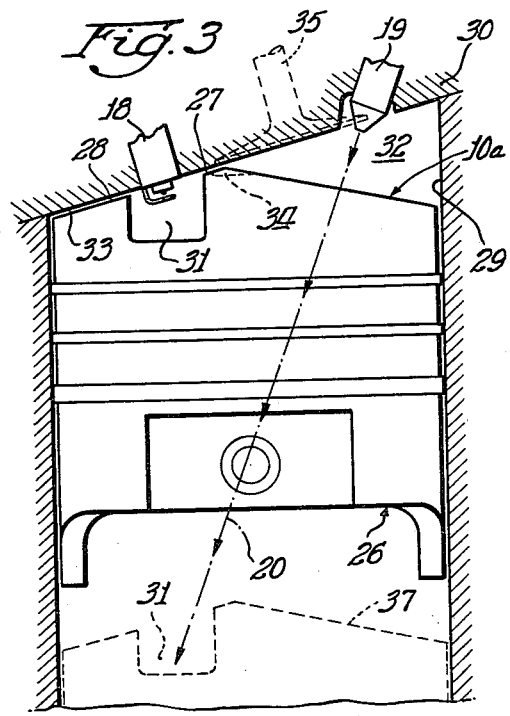
FIG. 3 is an axial sectional view similar to FIG. 1 but showing another embodiment of my invention, which, however, produces results similar to those obtained by the embodiment shown in FIG. 1.

FIG. 3 shows a modified form of my invention which is similar to that shown in FIG. 1. A piston 26 having a pair of ridges 27 and 28 on an irregular crown 10a is shown at T.D.C. within a cylinder 29. The T.D.C. position of the piston 26 places the ridges 27 and 28 in close proximity to a cylinder head 30 thereby providing a lineal pocket 31 within the confines of the ridges 27 and 28 which becomes an auxiliary ignition chamber at the T.D.C. of the piston 26. On the opposite side of the irregular crown 10a, a residual combustion space 32 is provided between the ridge 11 and the adjacent wall of the cylinder 29. The close proximity of the ridge 28 to an area 33 facing the ridge 28 is not to be considered as part of the residual combustion space 32 which, in engineering parlance, is generally termed a squish area. The ridge 27 is provided with a notched-out portion 34 which provides clearance with respect to an intake valve head 35. The spark plug 18 is inserted into the area of the auxiliary ignition chamber and the injection nozzle 19 is inserted through the cylinder head 30 at an angle such that the fuel injection stream 20, designated by arrows, is directed at the lineal pocket 31 when the piston 26 is approximately at B.D.C., as indicated by the dotted line 37.

Figure 4:
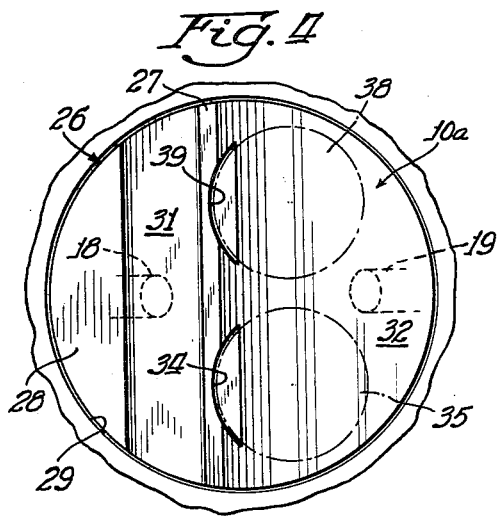
FIG. 4 is a plan view of the irregular crown of the piston head in FIG. 3 similar to FIG. 2.

FIG. 4 is a view looking down on the irregular crown 10a of the piston 26 in FIG. 3 showing, in phantom, the spark plug 18, the injection nozzle 19, the intake valve head 35 and an exhaust valve head 38. The ridge 27 is also provided with a notched-out portion 39 to provide clearance for the exhaust valve head 38.

FIGS. 5, 7, 10 and 12 show yet other modified forms of my invention and are characterized mainly by modifications with respect to the pockets.

In FIG. 5, a piston 40 is provided with an irregular crown 10b, having a pair of sloping faces 41 and 42, is shown at T.D.C. within a cylinder 43. The sloping face 41 has a pocket 44 therein which is crater-like in form. When the piston 40 is at T.D.C., the face 41 is in close proximity to a cylinder head 45 which is oblique with respect to a plane at right angles to the cylinder 43 thereby providing an auxiliary ignition chamber within the confines of the pocket 44 and the cylinder head 45. Also, when the piston 40 is at T.D.C., a residual combustion space 47 is formed within the confines of the face 42, the cylinder head 45 and the adjacent wall of the cylinder 43. The irregular crown 10b has a ridge 48 which is provided with a notched-out portion 49 serving as clearance for an intake valve head 50. A spark plug 18 is inserted in the area of the auxiliary ignition chamber and the injection nozzle 19 is inserted through the cylinder head 45 at an angle such that a fuel injection stream 20, designated by arrows, is directed at the pocket 44 when the piston 40 is at approximately B.D.C. as indicated by the dotted line 51.

FIG. 6 is a view looking down on the irregular crown 10b of the piston 40 in FIG. 5 showing, in phantom, the spark plug 18, the injection nozzle 19, the intake valve head 50 and an exhaust valve head 52. The irregular crown 10b is also provided with a notched-out portion 53 to provide clearance for the exhaust valve head 52.

In the modified form of my invention shown in FIGS. 7 and 8, a piston 54 has an irregular crown 10c which is provided with a ridge 55 in the form of an annular ring thereby providing within its confines a pocket 56, as shown in FIG. 8. The irregular crown 10c of the piston 54 is flat except for the ridge 55 and is on a plane parallel to a cylinder head 57. In common with other forms of my invention, shown herein, the ridge 55 is in close proximity to the cylinder head 57 thereby providing an auxiliary ignition chamber coinciding with the pocket 56, and a residual combustion space 58 as provided which surrounds the auxiliary ignition chamber as is apparent from the drawings. The spark plug 18 is inserted in the area of the auxiliary ignition chamber and the injection nozzle 19 is inserted through the cylinder head 57 at an angle such that the fuel injection stream 20, designated by arrows, is directed at the pocket 56 when the piston 54 is at approximately B.D.C. as indicated by a dotted line 59.

The embodiment in FIG. 9 is a modification of the embodiment in FIGS. 7 and 8 characterized by an annularly constricted residual combustion space 60 which provides what is known as a squish and quench area 61 between a cylinder head 62 and an irregular crown 10d of a piston 63. The other components comprise the spark plug 18, injection nozzle 19, an annular ridge 64 which provides a pocket 65 within its confines which forms an auxiliary ignition chamber when the piston 63 is at T.D.C.

The embodiment shown in FIGS. 10 and 11 functions similarly to the embodiment shown in FIGS. 7 and 8 and will therefore merely identify the components by number. A piston 66 is shown at T.D.C. and a line 67 indicates the B.D.C. of the piston 66 which has a continuous ridge 68 in a crown 10e which provides a pocket 69 that forms an auxiliary ignition chamber when the piston 66 is at T.D.C. 70 is a residual combustion space, 71 is a cylinder head and 72 is a cylinder.

The embodiment shown in FIGS. 12, 13 and 14 also function similarly to the embodiment shown in FIGS. 7 and 8 and therefore, in the main, the components will merely be identified by number. A piston 73 is shown at T.D.C. and a dotted line 74 indicates the B.D.C. of the piston 73. An irregular crown 10f has a ridge 75 which provides a pocket 76 that coincides with an auxiliary ignition chamber formed when the piston 73 is at T.D.C. 77 is a residual combustion space and 78 is a cylinder head.

Referring to FIG. 13, which is a view looking down on the irregular crown 10f of the piston 73, an intake valve head 79 and an exhaust valve head 80 are shown in phantom. The V-shaped ridge 75 is provided with notched-out portions 81 and 82 to provide clearance for the intake valve head 79 and the exhaust valve head 80, respectively. As can be seen from the drawing, the V-shaped ridge 75 comprises a ridge starting at the outer perimeter of the crown 10f of the piston 73 extends toward the center and returns to the outer perimeter of the piston 73 thereby providing the pocket 76 within its confines, and, when the piston 73 is at the T.D.C., the pocket 76 thereby becomes an auxiliary ignition chamber as stated above. The balance of the irregular crown 10f of the piston 73 provides the area for the residual combustion space 77. FIG. 14 is a view showing the open end of the pocket 76 which faces the adjacent wall of a cylinder 83.

The feature of a modified embodiment shown in FIG. 15 comprises a variable quantity injection nozzle 84 and a constant quantity injection nozzle 85. The variable quantity injection nozzle 84 injects a lean variable quantity of fuel at some point during the intake stroke or at the beginning of the compression stroke. Fuel for this purpose could also be provided by a carburetor with a variable jet. Fuel from the constant quantity injection nozzle 85 is supplied in a small constant quantity into a pocket 86, which, at T.D.C. of the piston 88 becomes an auxiliary ignition chamber which is formed within the confines of a ridge 87 on an irregular crown 10g of a piston 88, and a cylinder head 89, when the piston 88 is at T.D.C. A residual combustion space 90 is also provided within the confines of the other side of the ridge 87, the cylinder head 89 and the wall adjacent the cylinder head 89, when the piston 88 is at T.D.C. This modification, showing two injection nozzles, is applicable to the other embodiments shown herein.

It will be noted that in the form shown in FIGS. 1, 14 and 15, the pocket is within the confines of a ridge on the crown of the piston and the adjacent wall of the cylinder. In FIG. 3, the crown of the piston is provided with a lineal pocket within the confines of a pair of ridges and the adjacent walls of the cylinder opposite the ends of the lineal pocket. In FIGS. 5, 7 and 10, the irregularities of the crown of the piston provide pockets within the confines of the irregularities. In all these variations with respect to characteristics and locations of the pockets, an injection nozzle directs a fuel mixture at the pocket at substantially B.D.C. of the piston whereby at substantially T.D.C. a richer fuel mixture is retained in the pockets which thereby provides an auxiliary ignition chamber having a rich fuel mixture which is ignited by means of a spark plug inserted in the auxiliary ignition chamber. As the piston moves downwardly in its stroke, combustion spreads to the residual combustion space.

For the sake of simplicity and clarity, the invention has been described as applied to an engine having but one cylinder; obviously it is applicable to a multiple cylinder internal combustion engine.

In operation, all forms shown provide an irregular piston crown which provides a pocket, that at T.D.C. of the piston, coincides with an auxiliary ignition chamber which, in operation, is provided with a fuel mixture sufficiently rich to be ignited by a spark plug. From this focal point of ignition, the combustion speeds to the remainder of the space between the crown of the piston and the cylinder head as the piston moves down from T.D.C.

As heretofore stated, the main distinction between the forms represented by FIGS. 1, 3, 5, 7, 9, 10 and 12, on the one hand, and FIG. 15, on the other hand, is characterized by the use of the two fuel supply means in the former, and by one fuel supply means in the latter.

I shall first discuss the operation of the type represented by FIGS. 1, 3, 5, 7, 9, 10 and 12, and since, in operation, they are generally similar, the description of one with respect to operation is applicable to all and shall therefore for the sake of simplicity identify the components by name only.

Fuel is injected into the cylinder near B.D.C. following the intake stroke by means of either a high or low pressure injection system. Injection is initiated at an angle to the axis of the cylinder and directed at the pocket. At the beginning of injection, the fuel is directed at the pocket and substantially all fuel enters the pocket with small injected quantities. With larger fuel quantities, only the fuel at the beginning of the injection enters the pocket and the remainder enters the balance of the space between the crown and the cylinder head, and, at T.D.C., it is confined in the residual combustion space. This insures a rich mixture in the auxiliary ignition chamber for ignition. Since the injection of fuel requires a finite amount of time, it occurs over a portion of the piston stroke with the larger quantities of fuel requiring more crank angle time than the smaller quantities and therefore covering a greater portion of the piston stroke. It is obvious that the injected fuel is in line with the pocket for only a portion of the injection stroke. The amount of fuel trapped in the pocket at this time is the quantity required for ignition and the rest of the fuel is retained in the surrounding space which becomes the residual combustion space at T.D.C. It can be seen that, at idle, most or all of the fuel injected enters the pocket while at greater loads, a portion of the fuel enters the surrounding areas; the amount depending upon the engine load. The quantity of fuel entering the pocket is relatively constant. This distribution of the fuel is brought about by the angular path of the injected fuel.

A preferred method of operation uses a low pressure injection system. Injection of the fuel begins when the piston is at B.D.C., prior to the compression stroke at all engine operating conditions. At idle, all of the fuel is injected while the piston is essentially at B.D.C. As the fuel quantity is increased for operation at higher speeds and loads, the injection time period with respect to crank angle increases and the fuel cutoff point takes place at some point between B.D.C. and T.D.C. For example, full load requires the greatest quantity of fuel and therefore has the latest cutoff point. For this condition, a large portion of the fuel to that amount over the quantity required for ignition is not directed at the pocket and also is injected at increasing cylinder pressures. Therefore, the final portion of the fuel injected has little penetration which results in good fuel distribution and atomization creating a lean mixture in the space surrounding the pocket. High penetration is required only for the ignition fuel quantity which must penetrate sufficiently to enter the pocket. As this ignition fuel quantity is injected when the piston is at B.D.C. when the air charge is at atmospheric pressure, the low pressure injection system can be used. It should be noted that above a certain fuel quantity, the fuel injected beyond a certain position of the piston in its stroke would not be aimed at the pocket, because of the geometric arrangement of the injection nozzle and the pocket, thereby aiding distribution of the fuel throughout the space outside the pocket. Heat from combustion in the auxiliary ignition chamber will help vaporize the fuel and aid ignition, and the same vaporization will also help to cool the piston crown. Inertia of the fuel injected into the pocket causes an adequate amount of fuel to be retained in the auxiliary ignition chamber for ignition. As the piston nears the T.D.C., inertia of the accelerated fuel-air mixture in the pocket causes this mixture to surround the spark plug to form the locally rich mixture required for ignition at all operating conditions. It is known that lean mixtures will burn, once ignited. However, these lean mixtures burn at slower velocities which can result in a loss in specific power output from an engine. Location of the pocket in the crown speeds combustion of the lean mixtures in the residual combustion space because the pocket, coinciding with the auxiliary ignition chamber, carries with it ignited fuel and is united with the residual combustion space as the piston moves down in its cycle thereby propagating the flame front. Also, since the pocket is essentially open at all positions other than T.D.C., it is well scavenged and therefore is filled with a charge of fresh air for each cycle. Being open also permits maximum cooling of the pocket thereby avoiding the formation of a hot spot which could cause preignition.

The operation of the system shown in FIG. 15 uses two injection nozzles. Injection from the first nozzle takes place during the intake stroke of the engine and has a variable quantity of fuel. This fuel creates the overall lean mixture in the residual combustion space; as the piston nears T.D.C., the constant quantity of fuel is injected by the second nozzle. This quantity of fuel is sufficient for ignition in the auxiliary ignition chamber and is directed into it. Following ignition of the fuel in the auxiliary ignition chamber, the process proceeds in the same manner as for the other forms described above.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In an unthrottled internal combustion engine having a cylinder, air intake means and exhaust means for said cylinder, a cylinder head, said cylinder head defining a substantially flat plane which defines the upper limits of the said combustion space, a piston, said piston having an irregular crown and reciprocally operable in said cylinder, a combustion space between said cylinder head and said irregular crown, the said combustion space comprising an auxiliary ignition chamber and a residual combustion space when the said piston is substantially at T.D.C., said irregular crown providing means which separates said auxiliary ignition chamber from said residual combustion space, a spark plug inserted in said auxiliary ignition chamber, fuel injection means directing fuel at an angle to the axis of said cylinder, said injection means being timed so that the irregular portion of the said crown which provides the said auxiliary ignition chamber at top dead center is in line to receive the initial injection of said fuel and means for supplying electric current to said spark plug to thereby ignite said richer fuel mixture in said auxiliary ignition chamber.

2. In an unthrottled internal combustion engine, according to claim 1, wherein said means which separates said auxiliary ignition chamber from said residual combustion space comprises a ridge defining the boundary between the said auxiliary combustion chamber and the said residual combustion space.

3. In an unthrottled internal combustion engine, according to claim 1, wherein said cylinder head is on a plane at an angle with respect to horizontal and the said auxiliary ignition chamber comprises a lineal recess across the said crown of the said piston.

4. In an unthrottled internal combustion engine, according to claim 1, wherein said means which separates said auxiliary ignition chamber from said residual combustion space comprises a lineal ridge extending across said crown.

5. In an unthrottled internal combustion engine, according to claim 1, wherein said means which separates said auxiliary ignition chamber from said combustion space comprises a continuous ridge defining said auxiliary ignition chamber therewithin.

6. In an unthrottled internal combustion engine having a cylinder, air intake means and exhaust means for said cylinder, a substantially flat cylinder head, a piston, said piston having an irregular crown and reciprocally operable in said cylinder, a pocket provided by said irregular crown, a combustion space between said cylinder head and said irregular crown, the said combustion space comprising an auxiliary ignition chamber and a residual combustion space when said piston is at substantially T.D.C., said irregular crown providing means which separates said auxiliary ignition chamber from said residual combustion space, a spark plug inserted in said auxiliary ignition chamber, means for injecting fuel at an angle toward said pocket when said piston is substantially at bottom dead center to thereby provide a rich fuel mixture in said pocket, said pocket coinciding with said auxiliary ignition chamber at substantially T.D.C. to thereby provide a richer mixture in said auxiliary ignition chamber than in said residual combustion space and means for supplying electric current to said spark plug to thereby ignite said richer fuel mixture in said auxiliary ignition chamber.

7. In an unthrottled internal combustion engine, according to claim 6, wherein said substantially flat cylinder head is at an angle with respect to the axis of the piston and wherein said pocket is in the form of a crater.

8. In an unthrottled internal combustion engine, according to claim 6, wherein the said cylinder head is at right angles with respect to the axis of the piston and the said pocket is in the form of a crater.

9. In an unthrottled internal combustion engine having a cylinder, air intake means and exhaust means for said cylinder, a substantially flat cylinder head, a piston, said piston having an irregular crown and reciprocally operable in said cylinder, a combustion space between said cylinder head and said crown, a pocket provided by said irregular crown, said combustion space comprising an auxiliary ignition chamber coinciding with said pocket and a residual combustion space when said piston is approximately at T.D.C., a spark plug inserted in said auxiliary ignition chamber, means for injecting a fixed amount of fuel into said auxiliary ignition chamber, directed at an angle with respect to the axis of the said cylinder, means for providing varying amounts of fuel into said residual combustion space, and means for supplying electric current to said spark plug to thereby ignite said fixed amount of fuel in said auxiliary ignition chamber.

10. In an unthrottled internal combustion engine having a cylinder, air intake means and exhaust means for said cylinder, a substantially flat cylinder head, a piston, said piston having an irregular crown and reciprocally operable in said cylinder, a pocket provided by said irregular crown, a combustion space between said cylinder head and said irregular crown, the said combustion space comprising an auxiliary ignition chamber and a residual combustion space when said piston is at substantially T.D.C., said irregular crown providing means which separates said auxiliary ignition chamber from said residual combustion space, a spark plug inserted in said auxiliary ignition chamber, means for injecting fuel at an angle with respect to the axis of said cylinder into said pocket at a predetermined position of the piston in its cycle to thereby provide a rich fuel mixture in said pocket, and means for supplying electric current to said spark plug to thereby ignite said richer fuel mixture in said auxiliary ignition chamber.

References Cited in the file of this patent

UNITED STATES PATENTS

| | | |
|---|---|---|
| 988,734 | Newcomb | Apr. 4, 1911 |
| 1,947,375 | Broderson | Feb. 13, 1934 |
| 2,086,427 | Mock | July 6, 1937 |

FOREIGN PATENTS

| | | |
|---|---|---|
| 171,575 | Austria | Dec. 15, 1951 |
| 1,035,518 | France | Apr. 15, 1953 |